United States Patent
Aruga et al.

(10) Patent No.: US 7,049,358 B2
(45) Date of Patent: May 23, 2006

(54) HEAT RADIATION BLOCKING FLUORORESIN FILM

(75) Inventors: Hiroshi Aruga, Ichihara (JP); Koichi Oda, Ichihara (JP)

(73) Assignee: Asahi Glass Company, Limited, Tokyo (JP)

( * ) Notice: Subject to any disclaimer, the term of this patent is extended or adjusted under 35 U.S.C. 154(b) by 214 days.

(21) Appl. No.: 10/315,039

(22) Filed: Dec. 10, 2002

(65) Prior Publication Data

US 2003/0138637 A1   Jul. 24, 2003

(30) Foreign Application Priority Data

| Dec. 11, 2001 | (JP) | ............................. 2001-376890 |
| May 14, 2002 | (JP) | ............................. 2002-138591 |
| Oct. 22, 2002 | (JP) | ............................. 2002-307263 |

(51) Int. Cl.
*C08K 3/28* (2006.01)
*C08K 9/00* (2006.01)
*C08L 27/18* (2006.01)
*C08L 27/16* (2006.01)
*C08L 17/20* (2006.01)

(52) U.S. Cl. ....................... 524/404; 524/546; 523/200

(58) Field of Classification Search ................ 524/404, 524/545, 546; 428/422; 523/200, 212
See application file for complete search history.

(56) References Cited

U.S. PATENT DOCUMENTS

| 3,950,271 | A | * | 4/1976 | Linares et al. ............... 252/478 |
| 6,165,551 | A | * | 12/2000 | Lukacs et al. .............. 427/228 |
| 6,372,157 | B1 | * | 4/2002 | Krill et al. .................. 252/478 |
| 2003/0054160 | A1 | * | 3/2003 | Fisher et al. ................. 428/328 |
| 2004/0071957 | A1 | * | 4/2004 | Fujita ........................ 428/328 |

FOREIGN PATENT DOCUMENTS

| EP | 1 008 564 | 6/2000 |
| JP | 04175700 A | * 6/1992 |
| JP | 08259731 A | * 10/1996 |

OTHER PUBLICATIONS

Machine Translation of JP 08-259731 A (1996).*
Patent Abstracts of Japan, JP 2001-049190, Feb. 20, 2001.
Derwent Publications, AN 2001-268155, JP 2000-319554, Nov. 21, 2000.

* cited by examiner

*Primary Examiner*—Callie Shosho
(74) *Attorney, Agent, or Firm*—Oblon, Spivak, McClelland, Maier & Neustadt, P.C.

(57) ABSTRACT

A heat radiation blocking fluororesin film comprising a fluororesin containing a hexaboride.

18 Claims, 3 Drawing Sheets

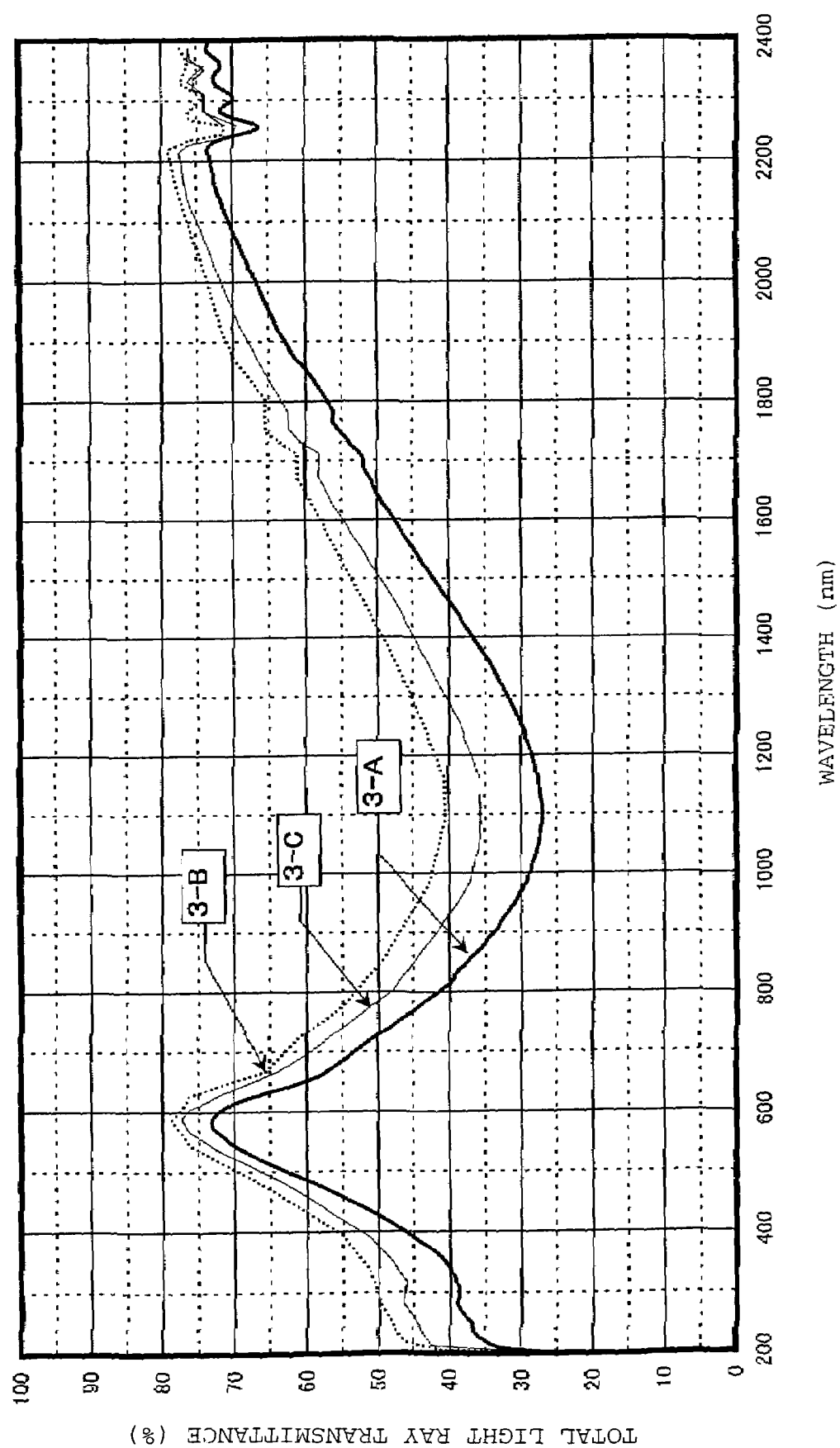

HEAT RADIATION BLOCKING FLUORORESIN FILM

The present invention relates to a fluororesin film excellent in transparency, infrared ray blocking properties and weather resistance.

In fields of agricultural covering materials and building materials, demands for plastic materials of which mechanical strength does not change even after exposure to outdoors for 10 years or more have been increasing. As a plastic excellent in weather resistance, polyethylene terephthalate and fluororesins are used. Particularly fluororesins, especially tetrafluoroethylene type copolymers are excellent in characteristics such as weather resistance, transparency and resistance to staining, and their characteristics are maintained outdoors for 15 years or more, and thus films comprising fluororesins are used as agricultural covering materials such as agricultural houses and roof materials for e.g. botanic gardens, exhibition halls and tents.

In recent years, development of heat radiation blocking plastic materials has been desired for covering materials for agricultural houses capable of so-called year-round culture for cultivation even at a high temperature season in summer. Further, also for roof materials for e.g. botanic gardens, exhibition halls and tents, development of heat radiation blocking plastic materials has been desired.

JP-A-10-139489 discloses a structure comprising a transparent glass sheet, and a heat radiation blocking film having a thin layer of a metal oxide formed on its surface, bonded to the glass sheet, as a covering material for agricultural houses. Further, JP-A-9-151203 discloses a polyester film having a heat radiation blocking layer obtained by coating a polyester film with an ultraviolet-curing acryl resin coating having tin oxide fine particles having heat radiation blocking properties or tin oxide fine particles doped with antimony dispersed therein.

However, with respect to the former structure, a covering material comprising a glass sheet and a film bonded is used, thus increasing the cost. Further, the weather resistance of an adhesive used for bonding the glass sheet and the film may not be sufficient, and the glass sheet and the film may be peeled off in a long-term use.

Further, with respect to the latter polyester film, since an infrared ray blocking layer is formed on a polyester film, the coating film and the film may be peeled off in a long-term outdoor use. Particularly in a use as an agricultural house, since the film is always subjected to deformation due to wind and weather, the coating film and the film tend to be peeled off.

Methods to overcome the above problems have been studied on agricultural covering materials having an infrared ray blocking material dispersed therein.

JP-A-11-246570 proposes an agricultural film comprising difluorotin naphthalocyanine dispersed in polyester, polyethylene or polyvinyl chloride. However, the weather resistance of difluorotin naphthalocyanine is not adequate, and a long-term outdoor use has been difficult.

The present inventors have conducted studies on fluororesin films comprising a fluororesin containing a metal oxide having infrared ray blocking properties and having a high weather resistance, such as fine particles of tin oxide or tin oxide doped with antimony, from a viewpoint to obtain such a film that the infrared ray blocking properties do not decrease for a long term, and the weather resistance of the film itself will be favorable.

However, it was found that since fine particles of tin oxide or tin oxide doped with antimony had a photocatalytic action, when they were exposed to outdoors, the fluororesin in contact with the fine particles underwent oxidative destruction due to ultraviolet rays, thus causing cavitation or whitening of the film. If the film undergoes whitening, the transmittance in the visible light region considered to be the photosynthesis region of plants extremely decreases, and thus such a film can not be used as an agricultural covering material.

JP-A-2001-49190 discloses a coating liquid comprising a hexaboride such as $LaB_6$ dispersed in a silica binder. A glass sheet having a coating film obtained by coating the coating liquid has infrared ray blocking properties, however, it was found that the heat radiation blocking properties decreased after about 1,000 hours in a moisture resistance test at 60° C. at 90%.

The present inventors have conducted extensive studies to overcome the above problems and as a result, they have found that a hexaboride does not have a photocatalytic action on a fluororesin, and its optical characteristics are maintained for a long term. The present invention has been accomplished on the basis of this discovery. Namely, it is an object of the present invention to provide a fluororesin film excellent in transparency, infrared ray blocking properties and weather resistance.

The present invention provides a heat radiation blocking fluororesin film comprising a fluororesin containing a hexaboride.

Further, the present invention provides the above heat radiation blocking fluororesin film, wherein the content of the hexaboride is from 0.01 to 1 part by mass based on 100 parts by mass of the fluororesin.

Further, the present invention provides the above heat radiation blocking fluororesin film, wherein the average particle size of the hexaboride is from 0.005 to 0.40 µm.

Further, the present invention provides the above heat radiation blocking fluororesin film, wherein the hexaboride is subjected to a surface treatment with irregular silica, and the mass ratio of the irregular silica as calculated as $SiO_2$ to the hexaboride is 30–100:100.

Further, the present invention provides the above heat radiation blocking fluororesin film, wherein the average particle size of the hexaboride subjected to a surface treatment with irregular silica is from 0.1 to 30 µm.

Further, the present invention provides the above heat radiation blocking fluororesin film, wherein the surface of the hexaboride is subjected to hydrophobilization with an organic silicon compound.

Further, the present invention provides the above heat radiation blocking fluororesin film, wherein the hexaboride is $LaB_6$.

Further, the present invention provides the above heat radiation blocking fluororesin film, wherein the fluororesin is at least one member selected from the group consisting of an ethylene-tetrafluoroethylene type copolymer, a hexafluoropropylene-tetrafluoroethylene type copolymer, a perfluoro (alkyl vinyl ether)-tetrafluoroethylene type copolymer and a tetrafluoroethylene-hexafluoropropylene-vinylidene fluoride type copolymer.

Further, the present invention provides the above heat radiation blocking fluororesin film, wherein the fluororesin is an ethylene-tetrafluoroethylene type copolymer.

Still further, the present invention provides the above heat radiation blocking fluororesin film, which contains, in addition to the hexaboride, cerium oxide and/or zinc oxide in a total amount of from 1 to 10 parts by mass based on 1 part by mass of the hexaboride.

In the accompanying drawings:

FIG. 3 is a diagram illustrating light ray transmittances of a film of Example 10 at a wavelength of from 200 to 2,400 nm.

Symbols used in Figs. are as follows.

Figure 1:
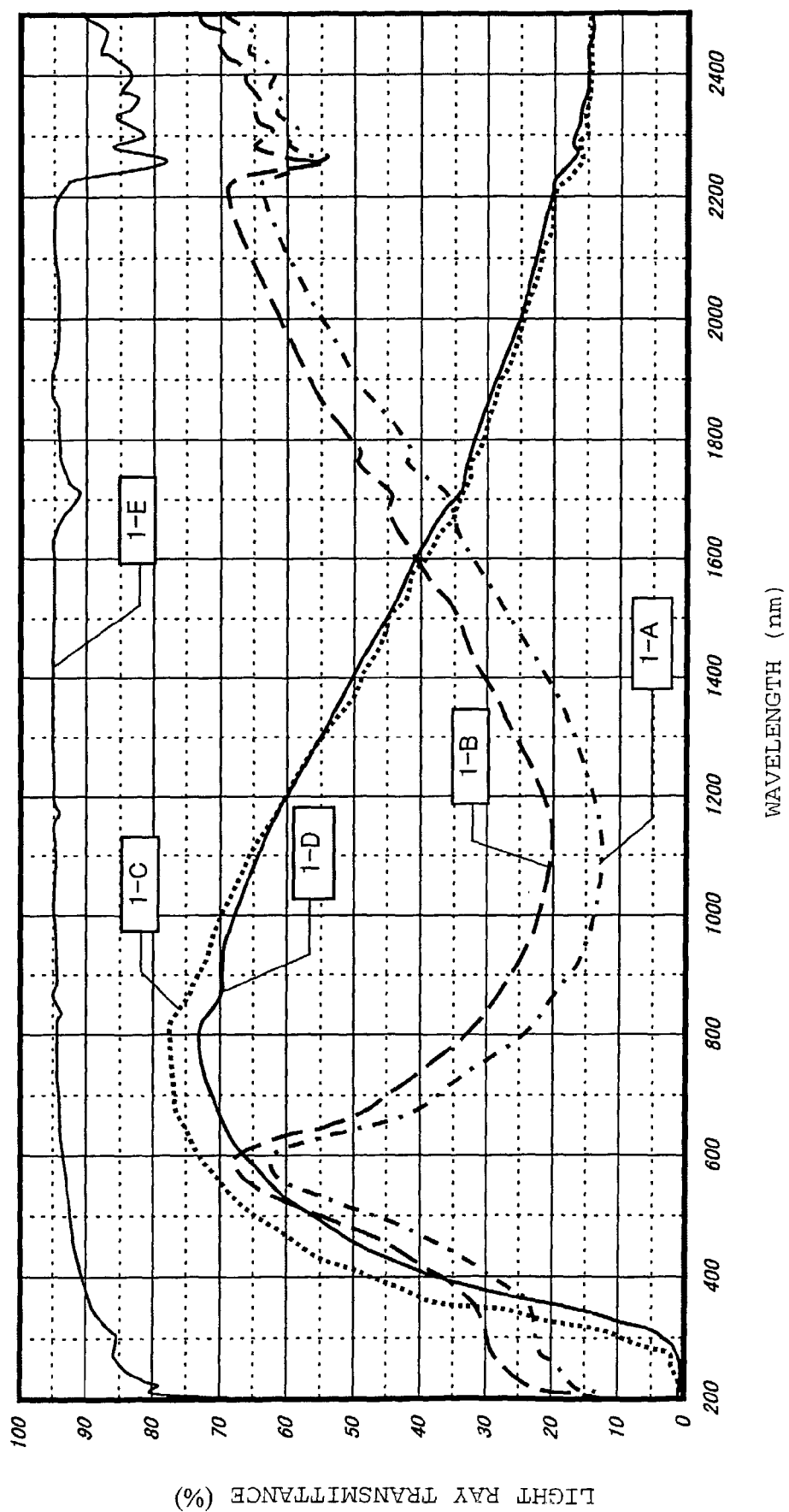
FIG. 1 is a diagram illustrating light ray transmittances of a film of the present invention at from 200 to 2,500 nm.

1-A: Initial light ray transmittance of film 1-A of Example 1, 1-B: light ray transmittance of the film of Example 1 after weather resistance test, 1-C: initial light-ray transmittance of film 1-C of Comparative Example 1, 1-D: Light ray transmittance of the film of Comparative Example 1 after weather resistance test, 1-E: initial light ray transmittance of a film 1-E of Comparative Example 2, 2-A: initial light ray transmittance of a film 6 of Example 6, 2-B: light ray transmittance of a film 6 of Example 6 after weather resistance test, 2-C: light ray transmittance of a film 6 of Example 6 after moisture resistance test, 2-D: light ray transmittance of an ETFA film 1-E of Comparative Example 2, 3-A: initial light ray transmittance of a film 10 of Example 10, 3-B: light ray transmittance of a film 10 of Example 10 after weather resistance test, and 3-C: light ray transmittance of a film 10 of Example 10 after moisture resistance test.

Now, the present invention will be described in detail with reference to the preferred embodiments.

In the present invention, the fluororesin used for the fluororesin film may, for example, be an ethylene-tetrafluoroethylene type copolymer (hereinafter referred to as ETFE), a hexafluoropropylene-tetrafluoroethylene type copolymer (hereinafter referred to as FEP), a perfluoro(alkyl vinyl ether)-tetrafluoroethylene type copolymer (hereinafter referred to as PFA), a tetrafluoroethylene-hexafluoropropylene-vinylidene fluoride type copolymer (hereinafter referred to as THV), polyvinylidene fluoride, a vinylidene fluoride-hexafluoropropylene type copolymer or polyvinyl fluoride. Among them, ETFE, FEP, PFA and THV are particularly preferred. More preferred is ETFE.

In the present invention, as ETFE, a copolymer of tetrafluoroethylene (hereinafter referred to as TFE) with ethylene (hereinafter referred to as E) and a copolymer of TFE, E and another monomer are preferred.

Said another monomer may, for example, be a fluoroolefin such as chlorotrifluoroethylene, hexafluoropropylene, perfluoro(alkyl vinyl ether) or vinylidene fluoride, a polyfluoroalkylethylene such as $CH_2=CHR^f$ (wherein $R^f$ is a $C_{1-8}$ polyfluoroalkyl group, the same applies hereinafter) or $CH_2=CFR^f$, or a polyfluoroalkyl trifluorovinyl ether such as $CF_2=CFOCH_2R^f$. They may be used alone or in combination of at least two.

Particularly preferred is $CH_2=CHR^f$, and $R^f$ is preferably a $C_{3-6}$ perfluoroalkyl group, most preferably $C_4F_9$.

As the composition of the ETFE, the molar ratio of the polymer units based on TFE/polymer units based on E is preferably from 70/30 to 30/70, more preferably from 65/35 to 40/60, most preferably from 60/40 to 45/55.

In a case where polymer units based on another comonomer are incorporated, the content of the polymer units based on another comonomer is preferably from 0.01 to 30 mol %, more preferably from 0.05 to 15 mol %, most preferably from 0.1 to 10 mol %, based on the total number of mols of polymer units based on TFE and ethylene.

In the present invention, the fluororesin may contain a fluororubber in order to impart plasticity. Preferably, the fluororubber may, for example, be a tetrafluoroethylene-propylene type elastic copolymer, a tetrafluoroethylene-vinylidene fluoride-propylene type elastic copolymer, a vinylidene fluoride-hexafluoropropylene type elastic copolymer, a tetrafluoroethylene-vinylidene fluoride-hexafluoropropylene type elastic copolymer or a tetrafluoroethylene-perfluoro(alkyl vinyl ether) type elastic copolymer. They may be used alone or in combination of at least two.

The content of the fluororubber is preferably at most 40 parts by mass, particularly preferably at most 20 parts by mass, based on 100 parts by mass of the fluororesin.

In the present invention, the thickness of the fluororesin film is not particularly limited, but is usually from 6 to 500 μm, preferably from 10 to 200 μm. If the film is too thin, breakage due to friction between an agricultural house and a support rod or the like will take place in five years or so, such being unfavorable. Further, if it is too thick, the amount of solar light to be transmitted will decrease, such being unfavorable.

In the present invention, it is preferred to subject one side of the fluororesin film to a surface treatment such as a corona discharge treatment and coat it with e.g. a silica type anti-sticking agent. Further, in a case where the fluororesin film is used as a curtain material in an agricultural house, it is also preferred to make holes having a diameter of from 100 μm to 10 mm on the fluororesin film within a range of not impairing the mechanical strength, in order to control visible light transmittance and/or water vapor transmittance.

In the present invention, a hexaboride is a metal hexaboride, and specific examples of which include lanthanum hexaborides such as $LaB_6$, lanthanide hexaborides such as $CeB_6$, $PrB_6$, $NdB_6$, $GdB_6$, $TbB_6$, $DyB_6$, $HoB_6$, $TbB_6$, $SmB_6$, $EuB_6$, $ErB_6$, $TmB_6$, $YbB_6$ and $LuB_6$, and alkaline earth metal hexaborides such as $SrB_6$ and $CaB_6$. Particularly preferred is at least one hexaboride selected from the group consisting of $LaB_6$, $CeB_6$, $NdB_6$ and $GdB_6$. More preferred is $LaB_6$ or $CeB_6$, and most preferred is $LaB_6$.

Such a hexaboride is a powder colored in e.g. brown black, gray black or green black, is dispersed as fine particles having a specific average particle size in a fluororesin film, and has such characteristics that a visible light rays of from 400 to 700 nm are transmitted, and near infrared rays of from 700 to 1,800 nm are blocked. In the present specification, blocking means blocking by absorption or reflection of infrared rays, and the hexaboride blocks infrared rays mainly by absorption.

The average particles size of the fine particles of the hexaboride used in the present invention is preferably from 0.005 to 0.40 μm. The average particle size is more preferably from 0.01 to 0.2 μm, most preferably from 0.03 to 0.15 μm. When the average particle size is within this range, transparency of the film containing the hexaboride is maintained, and a change into a fluoride due to a reaction with hydrofluoric acid (HF) generated in a slight amount in the fluororesin will not take place.

In the present invention, the content of the hexaboride is preferably from 0.01 to 1 part by mass, more preferably from 0.03 to 0.5 part by mass, most preferably from 0.05 to 0.3 part by mass, based on 100 parts by mass of the fluororesin. When the content is within this range, appropriate visible light blocking properties are obtained.

In the present invention, the hexaboride is preferably subjected to a surface treatment with irregular silica. Hereinafter hexaboride fine particles subjected to a surface treatment with irregular silica will sometimes be referred to as hexaboride composite particles. Here, the surface treatment with irregular silica means that the hexaboride is covered and mixed with the irregular silica.

The irregular silica may be amorphous silica, and specifically, preferred is irregular silica obtained by hydrolyzing a silicic acid compound or its partially condensed product such as No. 3 sodium silicate ($SiO_2$ content: 28.5%), or a tetraalkyl silicate such as tetraethyl silicate, tetramethyl silicate, tetrapropyl silicate or tetrabutyl silicate. As the irregular silica, a silicic acid compound or its partially condensed product may be used alone or in combination of at least two.

In the present invention, it is also preferred to bake the hexaboride particles selected to a surface treatment with irregular silica. As baking conditions, the particles are baked preferably at from 250 to 600° C. for at least 30 minutes, more preferably at from 400 to 550° C. for at least 1 hour. Moisture incorporated in the hexaboride composite particles, added or formed at the time of the surface treatment with irregular silica, is removed by baking. Further, the layer subjected to a surface treatment with irregular silica, after baked, will be more dense. The baking may be carried out either in the air or in a reducing atmosphere of e.g. nitrogen.

By the surface treatment of the hexaboride with irregular silica, the following two effects can be obtained.

(1) Solubility of the hexaboride in water can be decreased.

Even when hexaboride fine particles having an average particle size of at most 0.05 μm are used as a material, the hexaborate composite particles, which are subjected to a surface treatment with irregular silica, have a low solubility in water, and will not be eluted from the fluororesin even in a moisture resistance test, and the heat radiation blocking properties of the fluororesin film will be maintained.

(2) The reaction of a slight amount of HF generated from the fluororesin and the hexaboride is remarkably suppressed, and the hexaboride concentration in the fluororesin film will be maintained.

Although the fluororesin is chemically stable, if it is exposed to outdoors for from 10 to 15 years, the fluororesin partially deteriorates to generate free HF in the fluororesin film in some cases. In the hexaboride composite particles, the irregular silica acts as an acid receptor for HF, and the reaction of HF with the hexaboride is suppressed, and accordingly heat radiation blocking properties will be maintained for a long term.

Here, as the irregular silica has no influence over optical characteristics of the hexaboride, the hexaboride has such characteristics that visible light rays of from 400 to 700 nm are transmitted and near infrared rays of from 700 to 1,800 nm are blocked, even after the surface treatment with irregular silica.

In the present invention, it is preferred that the hexaboride is subjected to a surface treatment with irregular silica, and the mass ratio of the irregular silica as calculated as $SiO_2$ to the hexaboride is 30–100:100. If the amount of the irregular silica is small, no adequate surface treatment of the hexaboride fine particles may be carried out. The smaller the average particle size of the hexaboride fine particles, the larger the specific surface area, and thus a larger amount of the irregular silica is required for the surface treatment. The larger the amount of the irregular silica, the longer the heat radiation blocking properties will be maintained. On the other hand, if the amount of the irregular silica is too large, it will be necessary to increase the content of the hexaboride composite particles in the fluororesin film in order to obtain heat radiation blocking properties, whereby the haze of the fluororesin film tends to increase, and transparency tends to be impaired.

In the present invention, the hexaboride composite particles, which are hexaboride particles subjected to a surface treatment with irregular silica, preferably have an average particle size of from 0.1 to 30 μm. If the average particle size of the hexaboride composite particles is too small, the particles are likely to aggregate when dispersed in the fluororesin. Further, if the average particle size of the hexaboride composite particles is too large, holes or breakage are likely to take place on the film. The average particle size of the hexaboride composite particles is more preferably from 0.2 to 25 μm, most preferably from 0.5 to 20 μm.

As a method for producing the hexaboride composite particles, it is preferred that the fine particles of hexaboride subjected to a surface treatment with irregular silica are bonded by further using irregular silica as a bonding agent and grown into particles at a level of from 1 to 100 μm, and the particles are pulverized to obtain hexaboride composite particles having an average particle size of from 0.1 to 30 μm.

Examples of a surface treatment procedure in cases where No. 3 sodium silicate and tetraalkyl silicate are used as a material of the irregular silica will be described below, but the present invention is not limited thereto.

(1) In a Case of No. 3 Sodium Silicate

An aqueous mineral acid solution obtained by diluting a mineral acid such as hydrochloric acid, nitric acid or sulfuric acid with water, and an aqueous No. 3 sodium silicate solution are prepared. Then, into a water dispersion of a hexaboride heated to at least 50° C., the aqueous mineral acid solution and the aqueous sodium silicate solution are promptly dropped with adequate stirring, to form a slurry of hexaboride fine particles subjected to a surface treatment with irregular silica. At this time, the addition amount of sodium silicate is adjusted in order to achieve a predetermined $SiO_2$ amount based on the hexaboride amount. The hexaboride is gradually dissolved in water, and accordingly the reaction is completed within 1 hour. The formed slurry is washed with water, subjected to filtration and dried at from about 100 to about 150° C., and the formed particles are pulverized as the case requires to obtain hexaboride composite particles. Otherwise, in order to further improve weather resistance or moisture resistance of the heat radiation blocking properties of the fluororesin film, the formed particles are baked at from 250 to 600° C. for at least 30 minutes and then pulverized to obtain hexaboride composite particles.

(2) In a Case of Tetraalkyl Silicate

A hexaboride is dispersed in an alcohol solution such as isopropanol, and predetermined amounts of tetraalkyl silicate, and hydrochloric acid or ammonia are added thereto, and then water is added thereto, to hydrolyze the tetraalkyl silicate at from 60 to 70° C. At this time, stirring is continued until completion of the hydrolysis so that the formed irregular silica is fixed on the hexaboride fine particles. Then, in the same manner as in the case of sodium silicate, the formed particles are washed with water, dried, baked and pulverized. As the tetraalkyl silicate, preferred is tetramethyl silicate or tetraethyl silicate. When a tetraalkyl silicate is used, only $SiO_2$ forms after hydrolysis, and thus excellent heat resistance even in a baking process or a process of kneading with the fluororesin can be obtained. For example, hexaboride composite particles obtainable even after baking at 300° C. or higher do not undergo change of color and are preferred.

The fluororesin film of the present invention preferably contains the hexaboride composite particles in an amount of from 0.01 to 1 part by mass, more preferably from 0.03 to 0.5 part by mass, most preferably from 0.05 to 0.3 part by mass, based on 100 parts by mass of the fluororesin. Within this range, the fluororesin film is excellent in visible light ray blocking properties, and is suitable as a use for outside materials for agricultural houses or lightproof and heat radiation blocking curtains.

In a case where the heat radiation blocking fluororesin film of the present invention is used as an outside material, characteristics with a visible light ray transmittance of at least 75% and a solar light transmittance including infrared light (hereinafter referred to as solar radiation transmittance) of at most 65% are required. Further, if it is used as a lightproof heat radiation blocking curtain, characteristics with a visible light ray transmittance of from 30 to 70% and a solar radiation transmittance of at most 50% are required. For a use as agricultural covering materials, required characteristics vary depending upon crop plants and cultivation area, and it is preferred to adjust the visible light ray transmittance and the solar radiation transmittance of the fluororesin film correspondingly.

In the present invention, it is also preferred that the surface of the hexaboride or hexaboride composite particles is subjected to hydrophobilization with a hydrophobilizing agent. When the surface is subjected to hydrophobilization, the hexaboride or hexaboride composite particles are less likely to aggregate when the hexaboride or hexaboride composite particles and the fluororesin are kneaded by melting to form the fluororesin film.

The hydrophobilizing agent is preferably an organic silicon compound, particularly preferably a silane coupling agent or an organosilicone compound which is strongly bonded to the surface of the irregular silica and which can impart hydrophobicity.

The silane coupling agent is preferably one having no hydrophilic group nor reactive functional group such as an epoxy group or an amino group, particularly preferably an organic silicon compound having an organic group having hydrophobicity. The organic group having hydrophobicity is preferably an alkyl group, an alkenyl group, an aryl group, an aralkyl group, a fluoroalkyl group, a fluoroaryl group, etc. Particularly preferred is a $C_{2-20}$ alkyl group, a $C_{2-20}$ fluoroalkyl group having a fluorine atom, a phenyl group which may be substituted with an alkyl group or a fluoroalkyl group, etc.

The hydrolyzable group in the organic silicon compound may, for example, be an alkoxy group, an acyloxy group, an amino group, an isocyanate group or a chlorine atom. Particularly preferred is an alkoxy group having a carbon number of at most 4. Preferably from one to four, particularly preferably from two to three hydrolyzable groups are bonded to a silicon atom.

The organosilicone compound is preferably an organosilicone having an organic group and a hydroxide group or a hydrolyzable group directly bonded to a silicon atom. The organic group is preferably an alkyl group having a carbon number of at most 4 or a phenyl group. As such an organosilicone, one called silicon oil is preferred.

Specific examples of an organic silicon compound as the hydrophobilizing agent include trialkoxysilanes such as methyl trimethoxysilane, ethyl trimethoxysilane, isobutyl trimethoxysilane, hexyl trimethoxysilane, (3,3,3-trifluoropropyl)trimethoxysilane and ethyl triethoxysilane, and silicone oils such as dimethyl silicone oil, methyl hydrogen silicone oil and phenylmethyl silicone oil.

Among them, preferred are ethyl triethoxysilane, isobutyl trimethoxysilane, hexyl trimethoxysilane, dimethylsilicone oil and phenylmethyl silicone. They are preferred since these hydrophobilizing agents have a high reactivity with the hexaboride or hexaboride composite particles, and are capable of hydrophobilizing the hexaboride or hexaboride composite particles with a small amount.

In the present invention, the amount of the hydrophobilizing agent is optionally selected depending upon the surface area of the hexaboride or hexaboride composite particles, the reactivity of the hexaboride or hexaboride composite particles with the hydrophobilizing agent, etc. The amount of the hydrophobilizing agent is preferably from 1 to 50 parts by mass, more preferably from 3 to 20 parts by mass, most preferably from 5 to 10 parts by mass, based on 100 parts by mass of the hexaboride or hexaboride composite particles. Within this range, the hexaboride or hexaboride composite particles are less likely to aggregate, and the outer appearance of the fluororesin film will not deteriorate.

The treatment method with the hydrophobilizing agent is not particularly limited, but preferred is a method of dispersing the hexaboride or hexaboride composite particles in a solution of e.g. water, an alcohol, an acetone, n-hexane or toluene having the hydrophobilizing agent dissolved therein, followed by drying.

It is also preferred to incorporate an inorganic pigment such as iron oxide or cobalt oxide in addition to the above hexaboride or hexaboride composite particles into the fluororesin film of the present invention so as to control the visible light ray transmittance.

Further, it is also preferred to incorporate cerium oxide and/or zinc oxide into the fluororesin film. When the cerium oxide and/or zinc oxide is incorporated, the heat radiation blocking properties will be maintained for a longer term. The cerium oxide and/or zinc oxide particles are also preferably subjected to hydrophobilization in the same manner as for the hexaboride composite particles, and then kneaded with the fluororesin. The total content of cerium oxide and/or zinc oxide is preferably from 1 to 10 parts by mass, more preferably from 1.5 to 7 parts by mass, based on 1 part by mass of the hexaboride. When cerium oxide and/or zinc oxide is incorporated, the infrared ray blocking properties will be maintained for a longer term.

In the present invention, the reason why the hexaboride has heat radiation blocking properties is not clearly understood in detail, but is considered to be because such fine particles have a large amount of free electrons, and the absorption energy of an indirect transition between bands by free electrons in the inside and on the surface of the fine particles is in the vicinity of the visible light to near infrared region, and accordingly near infrared rays are absorbed. Particularly, $LaB_6$ has a maximum absorption wavelength in the vicinity of from 1,000 to 1,100 nm which is considered to be most intense among near infrared rays generated from solar light, and has a maximum transmission wavelength in the vicinity of 580 nm, and thus blocks near infrared rays and transmit visible light rays and is most preferred.

The heat radiation blocking fluororesin film of the present invention can be used as building materials as roof materials for e.g. botanic gardens, roofs for exhibition halls, domes and stadiums. Further, it can be used as agricultural covering materials such as outside materials for agriculture or curtains, and it makes cultivation of crop plants which have not been cultivated in summer, such as spinach and strawberry possible.

Now, the present invention will be explained in further detail with reference to Examples. However, it should be understood that the present invention is by no means restricted thereto.

Evaluation of heat radiation blocking properties, evaluation of heat radiation blocking effect, evaluation of weather resistance, evaluation of moisture resistance and measurement of the average particle size were carried out in accordance with the following methods.

Evaluation of heat radiation blocking properties: Using a UV-VIS-IR spectral measuring apparatus UV3100 manufactured by Shimadzu Corporation, the visible light transmittance and solar radiation transmittance were measured in accordance with JIS R3106 "Testing method on transmittance, reflectance and emittance of flat glasses and evaluation of solar heat gain coefficient".

Evaluation of heat radiation blocking effect: A polystyrene foam container having a space volume of 50×50×50 cm, having its five inner surfaces painted in black, was prepared, and a film obtained in each of Examples was bonded to the aperture and left to stand under direct sunlight (weather: clear) from 9 a.m. to 2 p.m., and the temperature in the inside of the container at 2 p.m. was measured to confirm the heat radiation blocking effect by comparison with an ETFE film of 100 μm. A small increase in temperature indicates excellent heat radiation blocking properties.

Weather resistance evaluation: JIS K7350-4 "weather resistance test: weather resistance test using an open-frame carbon-arc lamps" was carried out for 5,000 hours, and optical characteristics before and after the test were measured. The weather resistance as an agricultural house film was evaluated by the change.

Moisture resistance evaluation: A test film was put in a constant temperature and humidity tank of 60° C. at 90% RH for 2,000 hours, and then heat radiation blocking properties were evaluated as a measure for moisture resistance.

Average particle size: The average particle size was measured by particle size laser diffraction by using a scattering type particle size distribution measuring apparatus (LMS24 manufactured by SEISHIN ENTERPRISE CO., LTD.).

EXAMPLE 1

40 g of $LaB_6$ (lanthanum hexaboride) fine particles having an average particle size of 0.1 μm were dispersed in a 5% toluene solution of phenyl methyl silicone. Then, toluene was evaporated at 140° C. and removed to obtain 42 g of $LaB_6$ fine particles subjected to hydrophobilization with phenyl methyl silicone.

7 g of the $LaB_6$ fine particles subjected to hydrophobilization and 4 kg of ETFE (AFRON COP88AX manufactured by Asahi Glass Company, Limited) were mixed in a V mixer dryly. The mixture was pelletized by a twin screw extruder at 320° C. Using the pellets, a film 1-A of 100 μm was formed by a T-die method at 320° C. The optical characteristics of this film were measured by using a UV-VIS-IR spectral measuring apparatus UV3100 manufactured by Shimadzu Corporation. As the spectral characteristics in accordance with JIS R3106, the visible light ray transmittance was 56.5% and the solar radiation transmittance was 34.0%. Further, the infrared ray blocking properties of the film were measured. An ETFE film 1-E of 100 μm was used as a comparative sample.

In the case of the film 1-A, the temperature in the inside of the container was 32° C. at 2 p.m., whereas it was 39° C. in the case of the ETFE film 1-E of 100 μm as the comparative sample, and the difference was 7° C.

Further, the weather resistance evaluation of the film 1-A was carried out. After the test, the visible light ray transmittance was 62.6%, and the solar radiation transmittance was 41.4%, and the solar radiation transmittance increased by 7.4% as compared with before the test.

The light ray transmittances of the film 1-A, a film 1-B which was the film 1-A after the weather resistance test and the film 1-E are shown in FIG. 1.

EXAMPLE 2

A film 2 obtained in the same manner as in Example 1 except that the thickness of the film was 60 μm, was tested in the same manner as in Example 1 and the results are shown in Table 1.

EXAMPLE 3

A film 3 having a thickness of 100 μm, obtained in the same manner as in Example 1 except that 2.3 g of the hydrophobilized $LaB_6$ fine particles used in Example 1 was used, was tested in the same manner as in Example 1, and the results are shown in Table 1.

EXAMPLE 4

100 g of $CeO_2$ (cerium oxide) fine particles having an average particle size of 0.05 μm were dispersed in a 5% toluene solution of phenyl methyl silicone, and toluene was evaporated at 140° C. and removed to obtain 105 g of $CeO_2$ fine particles subjected to hydrophobilization with phenyl methyl silicone.

10 g of the cerium oxide subjected to hydrophobilization with phenyl methyl silicone and 2.3 g of the hydrophobilized $LaB_6$ fine particles prepared in Example 1 were mixed with 4 kg of the same ETFE as in Example 1. Then, the mixture was pelletized by a twin screw extruder at 320° C. Then, a film 4 of 100 μm was formed by a T-die method at 320° C. This film 4 was tested in the same manner as in Example 1, and the results are shown in Table 1.

EXAMPLE 5

5 g of the $CeO_2$ fine particles subjected to hydrophobilization with phenyl methyl silicone prepared in Example 4 and 2.3 g of the hydrophobilized $LaB_6$ fine particles prepared in Example 1 were mixed with 4 kg of the same ETFE as in Example 1 dryly. This mixture was pelletized by a twin screw extruder at 320° C. Then, a film 5 of 100 μm was formed by a T-die method at 320° C. The film 5 was tested in the same manner as in Example 1, and the results are shown in Table 1.

Comparative Example 1

Tin oxide fine particles doped with antimony (hereinafter referred to as ATO) subjected to hydrophobilization was obtained in the same manner as in Example 1 except that tin oxide particles doped with antimony, having an average particle size of 0.01 μm, were used instead of the $LaB_6$ fine particles having an average particle size of 0.1 μm. 100 g of the ATO fine particle were mixed with 4 kg of ETFE, and a film 1-C of 100 μm was formed in the same manner as in Example 1. Evaluation results of this film are shown in Table 1. A film 1-D which was the film 1-C after the weather resistance test underwent whitening, and its visible light ray transmittance significantly decreased. The light ray transmittances of the film 1-C and the film 1-D are shown in FIG. 1.

Comparative Example 2

Figure 2:
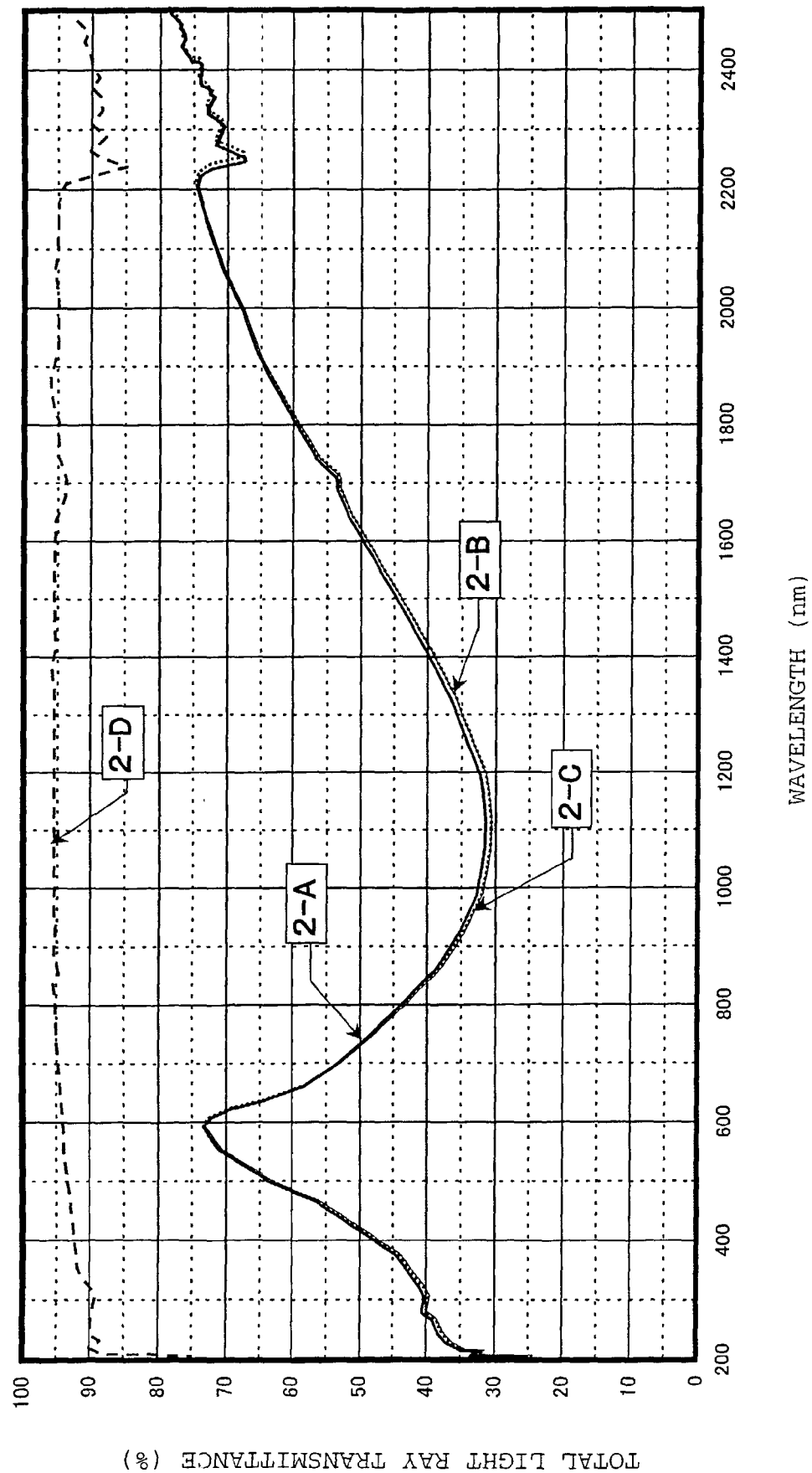
FIG. 2 is a diagram illustrating light ray transmittances of a fluororesin film containing $LaB_6$ composite particles of Example 6 at a wavelength of from 200 to 2,400 nm.

The visible light ray transmittance and the solar radiation transmittance of the ETFE film 1-E used as the comparative sample in Example 1 were both at least 91%. The light ray transmittance of the film 1-E is shown in FIG. 2 as 2-D.

The $LaB_6$ composite particles 1 subjected to a surface treatment with silica 60 had an average particle size of 4.0 μm.

15 g of the $LaB_6$ composite particles 1 subjected to a surface treatment with silica 60 was dispersed in 100 g of a 1% toluene solution of phenyl methyl silicone, and toluene was evaporated at 140° C. and removed to obtain 16 g of $LaB_6$ composite particles 1 subjected to a surface treatment with silica 60, hydrophobilized with phenyl methyl silicone.

TABLE 1

| | | Example 1 | Example 2 | Example 3 | Example 4 | Example 5 | Comparative Example 1 | Comparative Example 2 |
|---|---|---|---|---|---|---|---|---|
| Formulation | ETFE | 4000 | 4000 | 4000 | 4000 | 4000 | 4000 | 4000 |
| | $LaB_6$ | 7 | 4.2 | 2.3 | 2.3 | 2.3 | — | — |
| | $CeO_2$ | — | — | — | 10 | 5 | — | — |
| | ATO | — | — | — | — | — | 100 | — |
| Film No. | | 1-A | 2 | 3 | 4 | 5 | 1-C | 1-E |
| Film thickness (μm) | | 100 | 60 | 100 | 100 | 100 | 100 | 100 |
| Initial | Visible light ray transmittance (%) | 56.8 | 68.9 | 77.5 | 76.3 | 77.3 | 68.1 | 91 |
| | Solar radiation transmittance (%) | 34 | 48.5 | 62.5 | 61.7 | 62 | 63 | 91 |
| Weather resistance | Visible light ray transmittance (%) | 62.6 | 75 | 82.4 | 78 | 80.3 | 61.7 | 91 |
| | Solar radiation transmittance (%) | 41.4 | 58.3 | 71.7 | 64.5 | 67.7 | 59.2 | 91 |
| Infrared ray blocking properties (° C.) | | −7 | −5 | −3 | −3 | −3 | −2 | 0 |

EXAMPLE 6

10 g of the $LaB_6$ fine particles having an average particle size of 80 nm and 50 g of isopropanol were mixed by using a dispersing apparatus for 30 minutes to prepare a 16.7% isopropanol dispersion of the $LaB_6$ fine particles.

Then, 20 g (6.0 g as calculated as $SiO_2$) of tetraethyl silicate, 40 g of isopropanol, 0.5 g of ammonia water, 60 g of the isopropanol dispersion of the $LaB_6$ fine particles, and 60 g of water were sequentially added and mixed, followed by hydrolysis of tetraethyl silicate at 60° C. to obtain $LaB_6$ fine particles subjected to a surface treatment with irregular silica.

The obtained $LaB_6$ fine particles subjected to a surface treatment with irregular silica were subjected to filtration and washed with isopropanol, and then dried at 120° C. Then, baking in an electric furnace at 500° C. for 1 hour was carried out, and the obtained particles were pulverized in a pulverizer to obtain $LaB_6$ composite particles. The amount of the irregular silica used for the surface treatment of the $LaB_6$ particles as calculated as $SiO_2$ was 60 parts by mass based on 100 parts by mass of $LaB_6$. Hereinafter they will sometimes be referred to as $LaB_6$ composite particles 1 subjected to surface treatment with silica 60. Further, in the following Examples, "$LaB_6$ composite particles subjected to a surface treatment with silica nn" means composite particles subjected to a surface treatment with irregular silica in an amount of nn parts by mass based on 100 parts by mass of $LaB_6$.

Hereinafter they will sometimes be referred to as hydrophobilized $LaB_6$ composite particles 1 subjected to a surface treatment with silica 60. The hydrophobilized $LaB_6$ composite particles 1 subjected to a surface treatment with silica 60 had an average particle size of 4.2 μm.

3.0 g of the hydrophobilized $LaB_6$ composite particles 1 subjected to a surface treatment with silica 60 and 2,500 kg of ETFE (FURUON ETFE88AX manufactured by Asahi Glass Company, Limited) were mixed by a V mixer dryly. The mixture was pelletized by a twin screw extruder at 320° C. Using the pellets, a film 6 of 100 μm was formed by a T-die method at 320° C. The optical characteristics (heat radiation blocking properties) of the film 6 were measured. The visible light ray transmittance was 70.0%, and the solar radiation transmittance was 51.6%. Further, using the ETFE film 1-E of 100 μm as a comparative sample, the heat radiation blocking effect of the film 6 was measured.

In the case of the film 6, the temperature in the inside of the container at 2 p.m. was 34° C., whereas it was 39° C. in the case of the ETFE film 1-E of 100 μm as the comparative sample, and the difference was 5° C.

Further, the weather resistance evaluation of the film 6 was carried out, whereupon the visible light ray transmittance was 69.8% and the solar radiation transmittance was 51.7% after accelerated exposure of 5,000 hours, and substantially no change as compared with before the test was shown. Further, after the moisture resistance test for 2,000 hours, the visible light ray transmittance was 70.0% and the solar radiation transmittance was 51.6%, and substantially no change as compared with before the test was shown. The results are shown in Table 2. Further, the initial light ray transmittance 2-A of the film 6, the light ray transmittance 2-B after the weather resistance test and the light ray transmittance 2-C after the moisture resistance test at a wavelength of from 200 to 2,400 nm are shown in FIG. 2. Further, characteristics of the film 6 are show in Table 2.

EXAMPLE 7

Hydrophobilized $LaB_6$ composite particles 2 subjected to a surface treatment with silica 60 were obtained in the same manner as in Example 6 except that no baking at 500° C. was carried out. A film 7 having a thickness of 100 μm, obtained in the same manner as in Example 1 except that the hydrophobilized $LaB_6$ composite particles 2 subjected to a surface treatment with silica 60 were used, was tested in the same manner as in Example 6 and the results are shown in Table 2. Here, the $LaB_6$ composite particles 2 subjected to a surface treatment with silica 60 before hydrophobilization had an average particle size of 3.1 μm. The hydrophobilized $LaB_6$ composite particles 2 subjected to a surface treatment with silica 60 had an average particle size of 3.1 μm.

EXAMPLE 8

Hydrophobilized $LaB_6$ composite particles 3 subjected to a surface treatment with silica 100 were obtained in the same manner as in Example 6 except that no baking was carried out. The average particle sizes of the $LaB_6$ fine particles subjected to a surface treatment with irregular silica in an amount of 100 parts by mass before hydrophobilization and after hydrophobilization were 3.8 μm and 3.9 μm, respectively. A film 8 having a thickness of 100 μm, obtained in the same manner as in Example 6 except that hydrophobilized $LaB_6$ composite particles 3 subjected to a surface treatment with silica 100 were used, was tested in the same manner as in Example 6 and the results are shown in Table 2.

EXAMPLE 9

Hydrophobilized $LaB_6$ composite particles 4 subjected to a surface treatment with silica 30 were obtained in the same manner as in Example 6. The baking was carried out at 400° C. for 30 minutes. The average particle sizes of the $LaB_6$ composite particles 4 subjected to a surface treatment with silica 30 before hydrophobilization and after hydrophobilization were 2.1 μm and 2.2 μm, respectively. A film 9 having a thickness of 100 μm, obtained in the same manner as in Example 6 except that the hydrophobilized $LaB_6$ composite particles 4 subjected to a surface treatment with silica 30 were used, was tested in the same manner as in Example 6 and the results are shown in Table 2.

EXAMPLE 10

Hydrophobilized $LaB_6$ fine particles 5 were obtained by conducting hydrophobilization in the same manner as in Example 6 except that the $LaB_6$ fine particles obtained in Example 6 were used, and no surface treatment with irregular silica and baking were carried out. The hydrophobilized $LaB_6$ fine particles 5 had an average particle size of 0.15 μm. A film 10 having a thickness of 100 μm, obtained in the same manner as in Example 6 except that 2.2 g of the hydrophobilized $LaB_6$ fine particles 5 and 2,500 g of ETFE were used, was tested in the same manner as in Example 6 and the results are shown in Table 2. Further, the initial light ray transmittance 3-A of the film 10, the light ray transmittance 3-B after the weather resistance test and the light ray transmittance 3-C after the moisture test at a wavelength of from 200 to 2,400 nm are shown in FIG. 3.

EXAMPLE 11

$LaB_6$ composite particles 6 subjected to a surface treatment with silica 20 were prepared in the same manner as in Example 6. Baking was carried out at 500° C. for 1 hour. The particles had an average particle size of 3.3 μm. Then, hydrophobilized $LaB_6$ composite particles 6 subjected to a surface treatment with silica 20 were obtained in the same manner as in Example 6. The composite particles had an average particle size of 3.4 μm. A film 11 having a thickness of 100 μm, obtained in the same manner as in Example 6 except that the hydrophobilized $LaB_6$ composite particles subjected to a surface treatment with silica 20 were used, was tested in the same manner as in Example 6 and the results are shown in Table 2.

Comparative Example 3

Hydrophobilized tin oxide particles doped with antimony were obtained in the same manner as in Example 6 except that tin oxide particles doped with antimony having an average particle size of 0.01 μm were used instead of the $LaB_6$ particles. 100 g of the hydrophobilized tin oxide particles doped with antimony and 4 kg of ETFE were mixed, and then the same operation as in Example 6 was carried out to obtain a film 12 having a thickness of 100 μm, which was tested in the same manner as in Example 6 and the results are shown in Table 2. After the weather resistance test, the film underwent whitening, and the visible light ray transmittance significantly decreased. The film 11 was tested in the same manner as in Example 6 and the results are shown in Table 2.

TABLE 2

| | | Example 6 | Example 7 | Example 8 | Example 9 | Example 10 | Example 11 | Comparative Example 3 |
|---|---|---|---|---|---|---|---|---|
| Composite particles | Composition $LaB_6/SiO_2$ | 100/60 | 100/60 | 100/100 | 100/30 | 100/0 | 100/20 | — |
| | Baking condition | 500° C. 1 hr | — | — | 400° C. 30 min. | — | 300° C. 30 min. | — |
| Formulation | ETFE | 2500 | 2500 | 2500 | 2500 | 2500 | 2500 | 4000 |
| | Composite particles | 3.0 | 3.0 | 3.0 | 2.2 | 2.2 | 2.2 | — |
| | ATO | — | — | — | — | — | — | 100 |

TABLE 2-continued

| | | Example 6 | Example 7 | Example 8 | Example 9 | Example 10 | Example 11 | Comparative Example 3 |
|---|---|---|---|---|---|---|---|---|
| Film No. | | 6 | 7 | 8 | 9 | 10 | 11 | 12 |
| Film thickness (µm) | | 100 | 100 | 100 | 100 | 100 | 100 | 100 |
| Initial | Visible light ray transmittance | 70.0 | 69.9 | 81.5 | 73.4 | 68.9 | 72.7 | 68.1 |
| | Solar radiation transmittance | 51.6 | 50.8 | 69.0 | 56.8 | 48.5 | 55.6 | 63.0 |
| Weather resistance | Visible light ray transmittance | 69.8 | 72.9 | 82.1 | 73.6 | 75.0 | 81.2 | 61.7 |
| | Solar radiation transmittance | 51.7 | 54.5 | 70.6 | 57.7 | 58.3 | 69.1 | 59.2 |
| Moisture resistance | Visible light ray transmittance | 70.0 | 70.5 | 81.5 | 73.6 | 72.9 | 75.0 | 68.1 |
| | Solar radiation transmittance | 51.6 | 52.0 | 69.0 | 56.8 | 54.5 | 58.3 | 63.0 |
| Heat radiation blocking effect (° C.) | | −5 | −5 | −3 | −4 | −5 | −4 | −2 |

The heat radiation blocking fluororesin film of the present invention is excellent in transparency, heat radiation blocking properties and weather resistance. When it is used as a building material such as a roof material or as an agricultural covering material, increase in temperature of a room in summer can be suppressed, and its characteristics will be maintained for a long term.

The entire disclosures of Japanese Patent Application No. 2001-376890 filed on Dec. 11, 2001, Japanese Patent Application No. 2002-138591 filed on May 14, 2002 and Japanese Patent Application No. 2002-307263 filed on Oct. 22, 2002 including specifications, claims, drawings and summaries are incorporated herein by reference in their entireties.

What is claimed is:

1. A heat radiation blocking fluororesin film, comprising: a fluororesin containing a hexaboride;
   wherein the fluororesin is at least one member selected from the group consisting of an ethylene-tetrafluoroethylene copolymer, a hexafluoropropylene-tetrafluoroethylene copolymer, a perfluoro(alkyl vinyl ether)-tetrafluoroethylene copolymer and a tetrafluoroethylene-hexafluoropropylene-vinylidene fluoride copolymer.

2. The heat radiation blocking fluororesin film according to claim 1, wherein the content of the hexaboride is from 0.01 to 1 part by mass based on 100 parts by mass of the fluororesin.

3. The heat radiation blocking fluororesin film according to claim 1, wherein the average particle size of the hexaboride is from 0.005 to 0.40 µm.

4. The heat radiation blocking fluororesin film according to claim 1, wherein the hexaboride is subjected to a surface treatment with irregular silica, and the mass ratio of the irregular silica as calculated as $SiO_2$ to the hexaboride is 30–100:100.

5. The heat radiation blocking fluororesin film according to claim 4, wherein the average particle size of the hexaboride subjected to a surface treatment with irregular silica is from 0.1 to 30 µm.

6. The heat radiation blocking fluororesin film according to claim 4, wherein the irregular silica is amorphous silica.

7. The heat radiation blocking fluororesin film according to claim 1, wherein the surface of the hexaboride is subjected to hydrophobilization with an organic silicon compound.

8. The heat radiation blocking fluororesin film according to claim 1, wherein the hexaboride is $LaB_6$.

9. The heat radiation blocking fluororesin film according to claim 1, wherein the fluororesin is an ethylene-tetrafluoroethylene copolymer.

10. The heat radiation blocking fluororesin film according to claim 1, further comprising at least one of cerium oxide or zinc oxide in a total amount of from 1 to 10 parts by mass based on 1 part by mass of the hexaboride.

11. The heat radiation blocking fluororesin film according to claim 1, wherein the film is an extruded film.

12. The heat radiation blocking fluororesin film according to claim 11, having a thickness of from 6 to 500 µm.

13. The heat radiation blocking fluororesin film according to claim 1, wherein the film consists of a single extruded layer.

14. The heat radiation blocking fluororesin film according to claim 1, further comprising a fluororubber selected from the group consisting of a tetrafluoroethylene-propylene copolymer, a tetrafluoroethylene-vinylidene fluoride-propylene elastic copolymer, a vinylidene fluoride-hexafluoropropylene elastic copolymer, a tetrafluoroethylene-vinylidene fluoride-hexafluoropropylene elastic copolymer and a tetrafluroroethylene-perfluoro(alkyl vinyl ether) elastic copolymer.

15. The heat radiation blocking fluororesin film according to claim 1, wherein the thickness of the film is from 10 to 200 µm.

16. The heat radiation blocking fluororesin film according to claim 1, wherein the film has holes having a diameter of from 100 µm to 10 mm.

17. The heat radiation blocking fluororesin film according to claim 1, wherein the hexaboride is selected from the group consisting of $CeB_6$, $PrB_6$, $NdB_6$, $GdB_6$, $Tb_6$, $DyB_6$, $HoB_6$, $SmB_6$, $EuB_6$, $ErB_6$, $TmB_6$, $YbB_6$ and $LuB_6$.

18. The heat radiation blocking fluororesin film according to claim 1, wherein the hexaboride is an alkaline earth hexaboride selected from the group consisting of $SrB_6$ and $CaB_6$.

* * * * *